United States Patent
Haveliwala et al.

(10) Patent No.: US 10,185,770 B2
(45) Date of Patent: Jan. 22, 2019

(54) SYSTEM AND METHOD FOR PRESENTING MULTIPLE SETS OF SEARCH RESULTS FOR A SINGLE QUERY

(71) Applicant: Google LLC, Mountain View, CA (US)

(72) Inventors: Taher H. Haveliwala, Fremont, CA (US); Glen Jeh, San Francisco, CA (US); Sepandar Kamvar, San Francisco, CA (US)

(73) Assignee: Google LLC, Mountain View, CA (US)

( * ) Notice: Subject to any disclaimer, the term of this patent is extended or adjusted under 35 U.S.C. 154(b) by 251 days.

(21) Appl. No.: 14/078,464

(22) Filed: Nov. 12, 2013

(65) Prior Publication Data

US 2014/0143226 A1 May 22, 2014

Related U.S. Application Data

(63) Continuation of application No. 10/641,489, filed on Aug. 14, 2003, now Pat. No. 8,600,963.

(51) Int. Cl.
   *G06F 17/00* (2006.01)
   *G06F 17/30* (2006.01)

(52) U.S. Cl.
   CPC .... *G06F 17/30864* (2013.01); *G06F 17/3053* (2013.01)

(58) Field of Classification Search
   CPC .............................................. G06F 17/30864
   USPC ....................................................... 707/769
   See application file for complete search history.

(56) References Cited

U.S. PATENT DOCUMENTS

| | | | |
|---|---|---|---|
| 5,511,186 A | | 4/1996 | Carhart et al. |
| 5,642,502 A | * | 6/1997 | Driscoll .............. G06F 17/3064 |
| 5,704,060 A | | 12/1997 | Del Monte |
| 5,706,497 A | * | 1/1998 | Takahashi ......... G06F 17/30675 |
| 5,826,261 A | | 10/1998 | Spencer |
| 5,886,698 A | | 3/1999 | Sciammarella et al. |
| 5,933,822 A | * | 8/1999 | Braden-Harder ........................... G06F 17/30684 |
| 6,012,053 A | | 1/2000 | Pant et al. |
| 6,189,002 B1 | * | 2/2001 | Roitblat .............. G06F 17/3061 |
| 6,279,016 B1 | | 8/2001 | De Vorchik et al. |
| 6,289,342 B1 | | 9/2001 | Lawrence et al. |
| 6,334,129 B1 | * | 12/2001 | Kiyoki .............. G06F 17/30979 707/749 |
| 6,370,527 B1 | | 4/2002 | Singhal |

(Continued)

OTHER PUBLICATIONS

Office Action issued in European Application No. 15151760.4, dated Jun. 13, 2018, 8 pages.

(Continued)

*Primary Examiner* — Eliyah S. Harper
(74) *Attorney, Agent, or Firm* — Fish & Richardson P.C.

(57) ABSTRACT

A system and method for presenting search results is provided. The method includes submitting a query to a server and receiving from the server, in response to the query: a comprehensive list of search results that satisfy the query, and multiple position vectors, each position vector identifying a respective ordered subset of the search results in the comprehensive list. The method further includes storing the comprehensive list and the multiple position vectors, receiving a user-made selection identifying a subset of the multiple position vectors, and displaying a subset of the search results in the comprehensive list in accordance with the user-made selection.

19 Claims, 7 Drawing Sheets

(56) References Cited

U.S. PATENT DOCUMENTS

| | | | |
|---|---|---|---|
| 6,411,724 B1* | 6/2002 | Vaithilingam | G06F 17/30038 382/100 |
| 6,523,028 B1 | 2/2003 | DiDomizio et al. | |
| 6,601,061 B1 | 7/2003 | Holt et al. | |
| 6,704,729 B1* | 3/2004 | Klein | G06F 17/30696 |
| 6,839,714 B2 | 1/2005 | Wheeler et al. | |
| 6,990,477 B2 | 1/2006 | Cotner et al. | |
| 7,181,438 B1* | 2/2007 | Szabo | G06F 17/30522 |
| 7,188,106 B2 | 3/2007 | Dwork et al. | |
| 7,542,894 B2* | 6/2009 | Murata | G06F 17/27 704/1 |
| 7,961,201 B1* | 6/2011 | Fix | G06T 7/0004 345/629 |
| 8,600,963 B2 | 12/2013 | Haveliwala et al. | |
| 2002/0078045 A1 | 6/2002 | Dutta | |
| 2002/0099685 A1 | 7/2002 | Takano et al. | |
| 2003/0037074 A1 | 2/2003 | Dwork et al. | |
| 2003/0135495 A1 | 7/2003 | Vagnozzi | |
| 2003/0225755 A1 | 12/2003 | Iwayama et al. | |
| 2004/0059731 A1* | 3/2004 | Yianilos | G06F 17/30533 |
| 2004/0103087 A1 | 5/2004 | Mukherjee et al. | |
| 2004/0205051 A1* | 10/2004 | Kim | G06F 17/3069 |

OTHER PUBLICATIONS

International Search Report in International Application No. PCT/US2004/026631, International Filing Date Aug. 13, 2004, 4 pages.

Meng et al., "Building Efficient and Effective Metasearch Engines," ACM Computing Surveys, 34(1):48-89, Mar. 2002.

Barroso et al., "Web Search for a Planet: The Google Cluster Architecture," IEEE Micro, Mar.-Apr. 2003, 22-28.

Osada et al., "AlphaSlider: Searching Textual Lists with Sliders," Dept. of Computer Science, Univ. of Maryland, Apr. 1993, 1-10.

Carr et al., "Using Interaction Object Graphs to Specify Graphical Widgets," Dept. of Computer Science, Univ. of Maryland, Sep. 1994, 1-30.

Liao et al., "Browsing Unix Directories with Dynamic Queries: An Evaluation of Three Information Display Techniques," Technical Report CAR-TR-605 CS-TR-2841, Dept. of Computer Science, Univ. of Maryland, Feb. 1992, 21 pages.

European Office Action issued in European Application No. 04781341.5 dated Dec. 4, 2009, 7 pages.

Indian Office Action issued in Indian Application No. 882/CHENP/2006 dated Jan. 9, 2011, 7 pages.

Korean Office Action issued in Korean Application No. 2006-7002986 dated Feb. 9, 2011, 2 pages.

Office Action issued in U.S. Appl. No. 10/641,489 dated Feb. 21, 2006, 9 pages.

Office Action issued in U.S. Appl. No. 10/641,489 dated Aug. 18, 2006, 10 pages.

Office Action issued in U.S. Appl. No. 10/641,489 dated Feb. 22, 2007, 11 pages.

Office Action issued in U.S. Appl. No. 10/641,489 dated Aug. 9, 2007, 12 pages.

Office Action issued in U.S. Appl. No. 10/641,489 dated Feb. 6, 2008, 7 pages.

Office Action issued in U.S. Appl. No. 10/641,489 dated Sep. 4, 2008, 12 pages.

Office Action issued in U.S. Appl. No. 10/641,489 dated May 28, 2009, 13 pages.

Office Action issued in U.S. Appl. No. 10/641,489 dated Dec. 7, 2009, 19 pages.

Extended European Search Report issued in European Application No. 15151760.4 dated May 7, 2015, 7 pages.

* cited by examiner

| Identifier | site |
|---|---|
| 122 | www.aol.com |
| 135 | www.chat.yahoo.com |
| 148 | www.msn.com/download/messenger |
| 161 | www.indiatimes.com |
| 174 | www.rediff.com |
| 187 | www.icq.com |

SYSTEM AND METHOD FOR PRESENTING MULTIPLE SETS OF SEARCH RESULTS FOR A SINGLE QUERY

RELATED APPLICATIONS

The present application is a continuation of U.S. patent application Ser. No. 10/641,489, filed Aug. 14, 2003, which is incorporated herein by reference in its entirety.

BACKGROUND

The present invention relates to retrieval of electronic data in a computer network and, in particular, performing integrated data retrieval searches over a plurality of databases.

A computer network is a network of information sharing devices which comprises a network of computers connected together in a way that lets them share data and other devices (hard drives, printers, CD-ROMs, etc) among each other. Computer networks are typically classified based on the physical area they span; the area that a computer network spans may be a small office, a complete town, or even the entire world. Based on the area spanned by a computer network, these networks can be classified into a Home Area network (HAN), a Local Area Network (LAN), a Wide Area Network (WAN), a Metropolitan Area Network (MAN), and the Internet. The amount of information shared within a computer network depends upon its span and on the amount of data that needs to be shared between the computers (for solving one or more problems).

In a computer network, a server has applications and data that are usually shared by multiple computer users. Various information-sharing devices request information from the servers. These are often referred to as "clients". Thus, the server determines and provides the data required by the clients. This data may include a huge number of files, documents, audio files, video files, static image files (and pictures), etc. Hence, the servers usually have a large database of multimedia documents and files, and once a client sends a request, the server (or servers) identifies the documents that are requested by a client and sends the appropriate information. Indeed, the identification of relevant documents may require simple or complex computation to be performed by the server before it sends the relevant information to the client.

As the sharing of data increases over computer networks, finding the right data (that may reside within any given computer network or outside) becomes an important problem. To solve this problem various kinds of search engines have been introduced. These search engines take keywords from a client and return multiple search results that are relevant to those keywords. These keyword searches are often based on certain rules. These rules define algorithms that govern the search that is performed over different websites and/or web pages (herein after referred to as sites). For example, these algorithms can define a lower limit on the frequency of occurrence of a keyword in the searched site. Thus, sites in which the frequency of occurrence of the keyword is above the lower limit are treated as a set of "search results".

In addition to the abovementioned example, a complex algorithm has been discussed in U.S. Pat. No. 6,289,342, titled "Autonomous Citation Indexing And Literature Browsing Using Citation Context". This patent is assigned to NEC Research Institute, Inc. (Princeton, N.J.) and it relates to context based document search in hyperlinked environments.

Since every search engine is based upon a particular set of rules, it may or may not yield the best results for every search that may be requested by the client. Hence, the client may have to use more than one search engine, and hence may have to go from one searching sites to the next. (For example, if the search engine provided by Google, of Mountain View, Calif., does not provide the results as desired by the user for a given search, the user may have to use the search engine provided by Altavista, of Palo Alto, Calif.). In fact, most of the time, the client and its human user does not even know whether a given search engine provided good results. Hence, the user may end up performing search on more than one search engines in order to obtain accurate information (and then collating the data and figuring out the "good search results" from "not so good search results").

Websites like www.webcrawler.com host search engines that provide a user with an option of using multiple search engines simultaneously. These sites take a keyword from the user and perform search using multiple search engines. The search results from these search engines are then gathered and displayed to the user. Since these sites make use of multiple search engines, the results provided to the user are usually more exhaustive. For each search result, the server passes an "Identification tag" called the Uniform Resource Locator (URL) to the client. A URL can be defined as a syntax and semantics of formalized information for location and access of resources on the Internet. If the user clicks on the URL provided by the search engine then the user is connected to that web-site or that web page. Thus, the server transfers URLs corresponding to each search result and these URLs are used by the client to access the corresponding site. The transfer of a number of URLs from multiple search engines makes the data to be transferred to the client large. Transfer of this large amount of data between the server and the client of www.webcrawler.com consumes a lot of bandwidth. This is particularly true when the client is a portable device whose bandwidth is limited.

The abovementioned limitation was resolved by search engines supported by website www.metacrawler.com. This search engine collates the data extracted from different search engines before passing the data to the client. For example, www.metacrawler.com makes use of a number of search engines to obtain results matching the user's keywords. Each search engine comes up with a set of search results. Usually a number of search results are common to two or more sets of search results. The search engine supported within www.metacrawler.com identifies these common search results and passes information regarding the common search results only once. This avoids undue multiplicity in the data sent to the client. Thus, the amount of information passed to the client is reduced. However, sites like www.metacrawler.com detect multiplicity by doing a string match on the URLs of the results. This makes these sites computationally intensive and expensive.

Moreover, these sites make use of search engines provided by third parties like Google, AltaVista, etc. These sites have no control over the operation of these search engines. These search engines perform their search independent of each other. These search engines perform a search and send the search results in an unregulated manner. Hence, these sites (that support multiple search engines) often end up overconsuming the bandwidth allocated. This may often lead to delay in the display of information at the user end.

Along with the aforementioned limitations, sites that host multiple searches display only a limited set of search results. For accessing more information related to that search (or for accessing more information from a given search engine), a new request is sent to the server. Thus, for obtaining results for a query, multiple requests for the same query are sent to the server. Therefore, whenever a user makes multiple requests, the server and the communication link established between the server and the client may be substantially burdened (both in terms of communication bandwidth and in terms of computation).

As mentioned above sites like www.dogpile.com and www.metacrawler.com passes the URLs of the search results to the client. This consumes a lot of bandwidth. An approach mentioned in U.S. Pat. No. 6,263,330, Titled "Method And Apparatus For The Management Of Data Files", reduces the abovementioned overload. The approach assigns pointers to the URLs that are retrieved from appropriate medical information servers. The data that is transferred to the client is an index file that stores pointers to the URLs retrieved and a corresponding map. This map links the pointers to their corresponding URLs. Hence, for each search engine the results are displayed using the pointers and the map. However, this approach reduces the data to be transferred in case of usage of multiple search engines. In case of a single search engine, the approach ends up sending more data. However, there is a further scope of reducing the amount of data transferred in case of multiple search engines.

All search engines present in the prior art are limited by one or more of the limitations mentioned above. Hence, there is a need for a system that minimizes the amount of information transferred between the server and the client for providing multiple sets of search results from different search engines. Also, there is a need for a system that reduces the burden of requests on the server, i.e., a system that limits the communication established between a client and the server. Also, a need exists for optimizing the bandwidth used during the search by controlling different search engines that may be used.

SUMMARY

An object of the disclosed invention is to provide a system and a method for managing multiple sets of search results for a user query.

Another object of the disclosed invention is to provide a system and a method that presents multiple search results for a user query by a single interaction between a server and a client.

Another object of the disclosed invention is to provide a system and a method that reduces the amount of data that is passed between a server and a client.

Yet another object of the disclosed invention is to provide a system and a method that controls different search engines to optimize their bandwidth consumption.

A computer network in accordance with the disclosed invention comprises a Database, a plurality of Ranking Functions and a Search Modulator at the server side and a Visualization Module and a Graphical User Interface (GUI) at the client side.

The Database stores a number of documents (which may be web pages, medical documents, scientific reports, etc.), metadata about each document (such as title, abstract and URL) and a unique identifier for each document. The unique identifiers are integers used to identify documents in the database. A Ranking Function performs search on the Database to come up with a set of search results for a user query. The search results thus obtained are then ranked in the order of relevance. The step of ranking is performed by the corresponding Ranking Function. Outputs of the Ranking Functions are passed to the Search Modulator. The Search Modulator then consolidates the search results across these multiple sets of search results to generate a comprehensive list of search results and their respective identifiers. The consolidated search results are then passed to the Visualization Module on the client side.

The Visualization Module stores the consolidated search results. In addition, the Visualization Module selects the search results that lie in the user defined boundary and passes them to the GUI. The GUI then presents these results to the user. The user defines the boundary using the GUI. For the consolidated search results stored at the Visualization Module, the user may define the boundary a number of times. Each time, the Visualization Module identifies the search results corresponding to the boundary and passes them to the GUI for display.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION

The disclosed invention relates to a system and a method that manages a user query by a single interaction between a server and a client. The server performs multiple searches for a user query and generates multiple sets of search results. These multiple sets of search results are consolidated at the server and then passed to the client hosting the query. The client then stores the multiple sets of consolidated search results. The stored consolidated search results are thereafter presented to the user. The presentation of the search results is governed by a boundary defined by the user. This boundary defines the portions of the search results that the user wants to view. For a stored consolidated search result set, the user may define the boundary multiple times. Each time the user defines a boundary, the portion of the search results that lies within the boundary are presented to the user. Thus, for a query, the user may make multiple requests for presentation of search results. Since consolidated search results are stored at the client, these requests are managed at the client end only and no interaction with the server is required.

Figure 1:
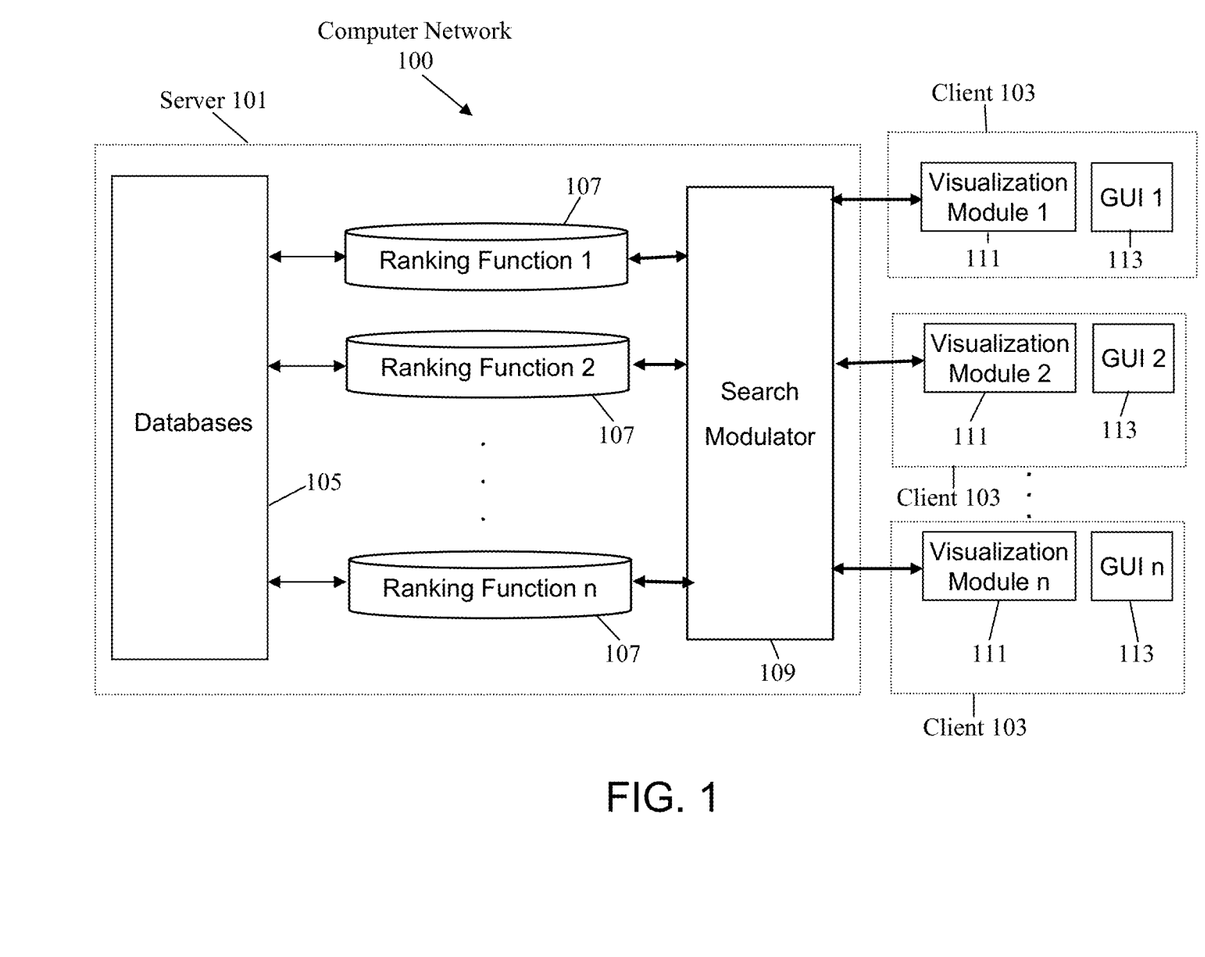
FIG. 1 illustrates the elements present at the server end and at the client end in a computer network in accordance with the present invention.

FIG. 1 illustrates the elements present at the server end and the client end in a computer network 100 in accordance with the present invention. Computer network 100 can be an intranet or the Internet. Computer network 100 comprises a Server 101 and a plurality of Clients 103. Server 101 comprises a Database 105, a plurality of Ranking Functions 107 and a Search Modulator 109. Database 105 stores documents (which may be sites, medical documents, scientific reports etc.), metadata about each document (such as title, abstract and URL) and a unique numerical identifier for each document. The unique numerical identifiers are preferably integers and are used to identify documents in the database. These numerical identifiers are used to identify documents instead of URLs (as used in the prior art). While the identifiers don't need to be integers, they can be doubles, however, integers use less space.

There are two advantages associated with using numerical identifiers (integers). Firstly, a unique numerical ID for a document takes far less space than the actual document itself or the URL of the document. Secondly, comparing two identifiers (integers) is far easier than comparing two documents. So, it can be easily identified that two search results refer to the same document by simply comparing their IDs, rather than their titles or URLs. Each Ranking Function 107 performs search on Database 105 to come up with a set of search results. Each Ranking Function 107 then ranks the search results in an order of relevance. Search Modulator 109 consolidates search results across the multiple sets of search results to generate a comprehensive list of search results and their identifiers. This reduces the amount of data to be passed to client 103.

Client 103 comprises a Visualization Module 111 and a Graphical User Interface (GUI) 113. Visualization Module 111 stores and sends the multiple sets of search results, corresponding to a user-defined boundary, to GUI 113. GUI 113 presents the search results to the user. GUI 113 presents the search results based on the boundary set by the user.

Figure 2:
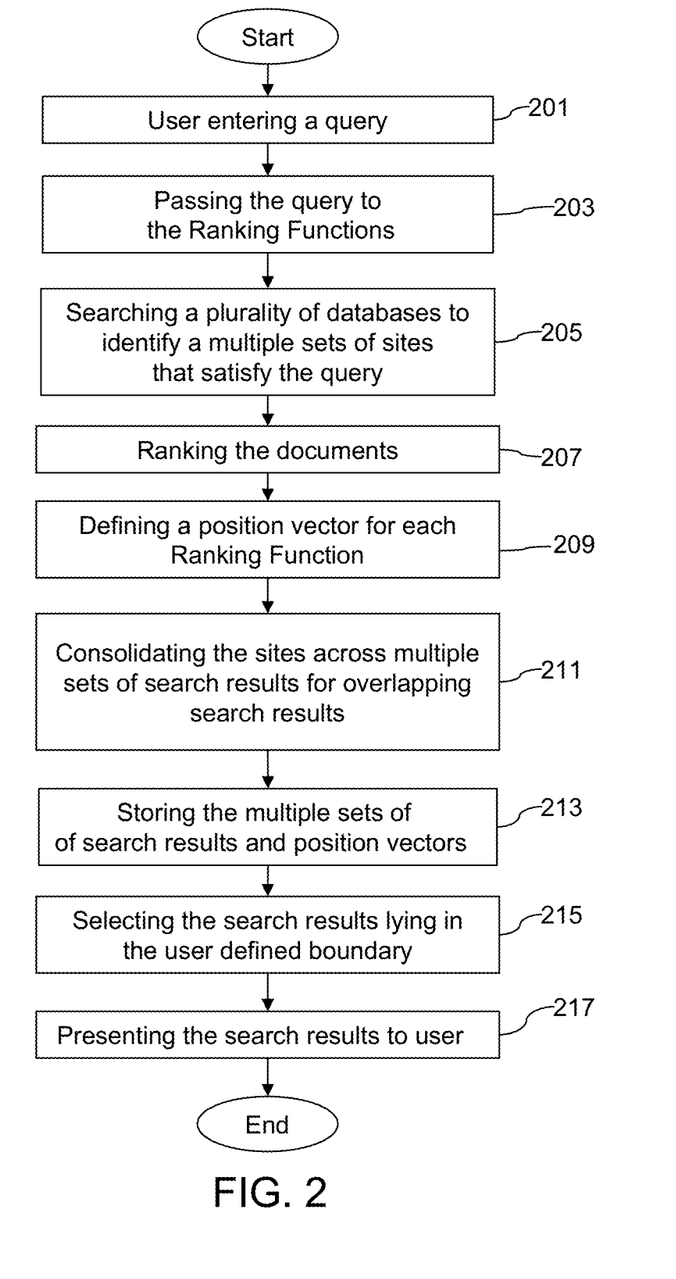
FIG. 2 is a flowchart that illustrates the steps involved in performing integrated data retrieval searches for a user query in accordance with the present invention.

The steps involved in managing a user query can be explained by means of the flowchart in FIG. 2. The method starts at step 201 with a user entering a query and defining a boundary using GUI 113. The query entered by the user may be a keyword or a combination of keywords. GUI 113 provides a user with an option to set the boundary for the search. This boundary provided by the user defines the portion of search results to be displayed. Thus, by defining a boundary the user has an option to view a single set of search results, multiple sets of search results or a combination of multiple sets of search results.

In step 203, the keyword(s) is passed to each Ranking Function 107 at Server 101. Each Ranking Function 107 then sets a plurality of rules for the search. These rules are guidelines that govern the way a search is conducted in Database 105. Each rule has its own guideline that defines the way a search is conducted. For example, a rule might count the number of times a keyword occurs in the searched documents. Another example, a rule might link another keyword to the searched keyword and look for the combination in the searched documents. Several such rules are known in the art.

Figure 4:
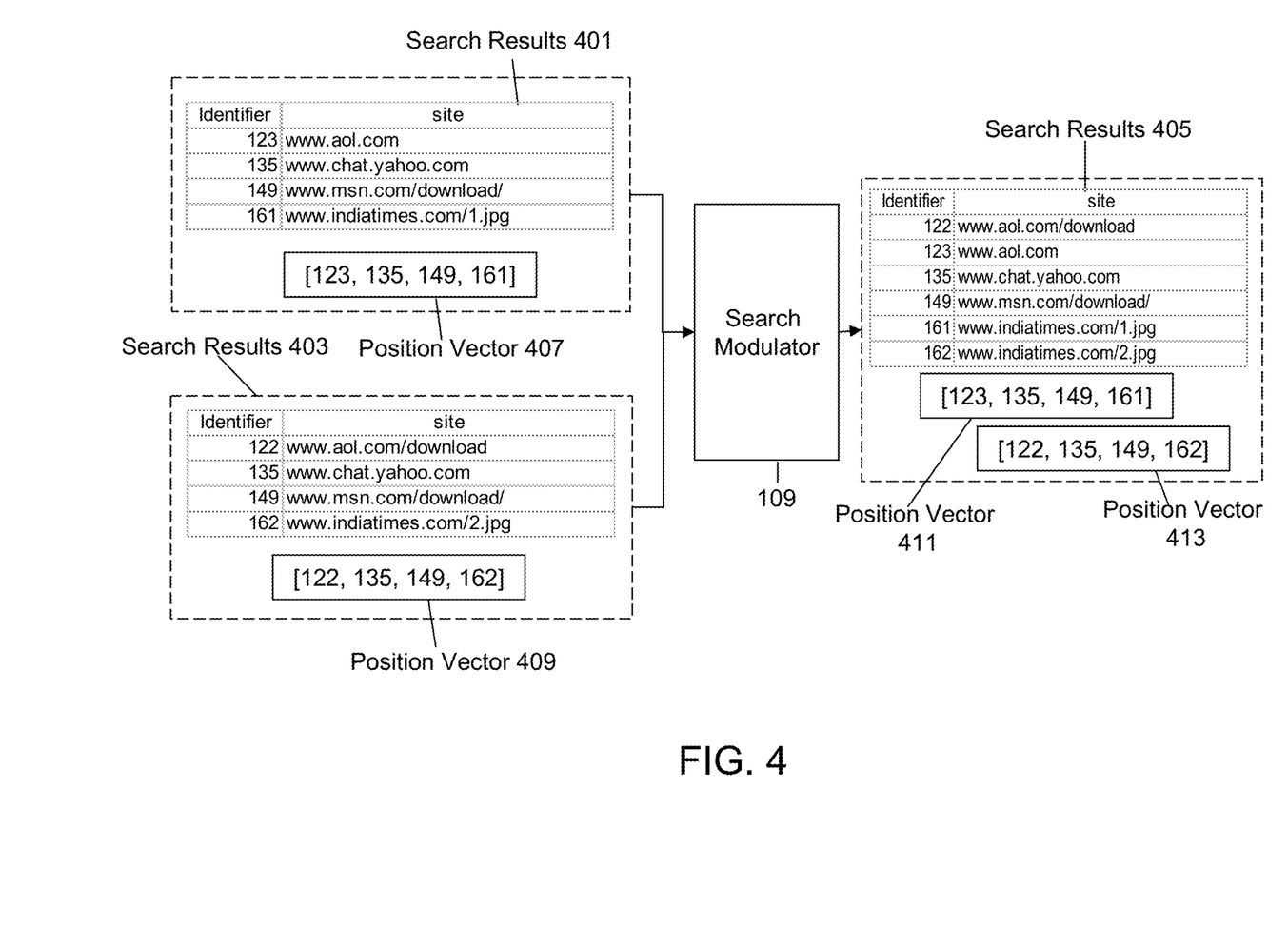
FIG. 4 illustrates the functioning of a Search Modulator.

In step 205, based on these rules, each Ranking Function 107 performs a search on Database 105. Database 105 contains documents (sites, medical documents, scientific reports, etc.), metadata about each of these documents and a unique numerical identifier assigned to each document. Ranking Functions 107, based on the rules established by them, searches Database 105. After the search has been completed, each Ranking Function 107 comes up with a set of search results. A search result comprises the parent link of the documents that satisfies the rules for search and the identifier corresponding to these documents. The search may also contain metadata like abstract or title of the document satisfying the search criteria. FIG. 4 is illustrates the search results of one such web-based search. A set of search results 401 and a set of search results 403 are two such examples of a web based search result generated by ranking functions.

After multiple sets of search results are obtained, each Ranking Function ranks the search results present in a set (at step 207). These search results are ranked according to a ranking algorithm. The search results are ranked in the order they satisfy the rules set for the search. So, a document satisfying the guidelines set by a rule to a larger extent will be ranked higher than the documents satisfying the guidelines less. For example, for a rule that relates to frequency of occurrence of a keyword in a document, a document with higher frequency would be ranked higher. At step 209, position vectors are generated for each Ranking Function 107. These position vectors store identifiers of the search results. These position vectors store the identifiers in the order of their rank. An example of a position vector is shown in FIG. 4. At this step, the system may optionally generate a ranking list for the documents searched. This list stores quantifiable scores of searched documents with respect to their satisfying the guidelines for search. For example, consider a position vector [3128, 1655, 5, 16] associated with a ranking function. As already discussed, the identifiers are ordered in a position vector according to their rank. Consider a case where the document with identifier 3128 has a score of 0.94, document with identifier 1655 has a score of 0.8 and documents with identifiers 5 and 16 have scores of 0.3 and 0.1 respectively. Thus, the ranking list corresponding to position vector can be represented as [0.94, 0.8, 0.3, 0.1].

At step 211, Search Modulator 109 consolidates the search results across multiple sets of search results. Search Modulator 109 creates a comprehensive list of documents searched and their identifiers. At this step, common search results across different sets of search results are identified and a comprehensive list of the search results is generated. This list contains a single entry corresponding to a search result. This prevents multiple copies of a document to be sent to the client. Hence, reducing the amount of data that is sent to the client. Search Modulator 109 then sends the consolidated list to Visualization Module 111. Step 211 as performed by Search Modulator 109 is further described with the help of an example with reference to FIG. 4. The example illustrates a consolidated list of the sites 405 being generated by Search Modulator 109 from the set of search sites 401 and set of searched sites 403.

At step 213, Visualization Module 111 at client 103 stores multiple sets of search results by storing the position vectors, and the comprehensive list of search results and their identifiers. Visualization Module 111 then reads the boundary set by the user. This boundary as described above is the users' requirement for display of search results. The boundary provided by the user may contain a request for a single set of search results, multiple sets of search results or a combination of two or more sets of search results. At step 215, Visualization Module then selects the data lying within the boundary set by the user and sends it to GUI 113 for display. At step 217, GUI 113 displays this selected set of search result to the user.

In case the user wants to view portions of the search results other than that displayed for a boundary, the user may redefine the boundary. In such a case steps 215 and 217 are performed again for the new boundary. Visualization Module 111 reads this boundary and identifies search results that lie within the redefined boundary. The search results thus identified are then presented through GUI 113. Thus, presentation of a search results for a boundary is taken care by Visual Module 111 within Client 103. Thus, no further communication between Client 103 and Server 101 is required. As a result, for a query only one exchange of data takes place between Server 101 and Client 103.

Figure 3:
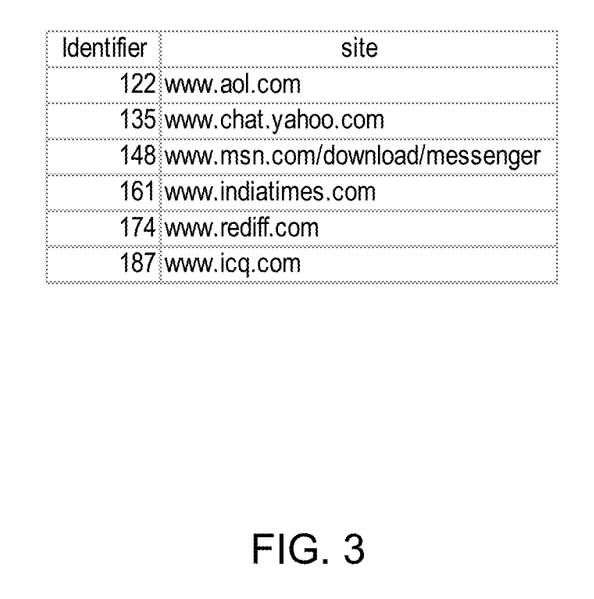
FIG. 3 illustrates the information and way this information related to different documents is stored in a Database.

FIG. 3 is an exemplary illustration of the way the data is stored in Database 105. Database 105 stores the identifiers linked to a document and the document itself. For instance, site www.aol.com is linked to identifier 122 and site www-.chat.yahoo.com is linked to identifier 135. In addition to sites Database 105 may be used to store medical documents, legal files or any other data that is to be shared over computer network 100. Database 105 may also contain metadata related to a document. This metadata may store additional information like titles, abstract of documents etc. Documents, additional information related to them and their identifiers may be stored in a flat file database, an inverted index, a relational database or any other database known in the art. In addition, Database 105 is periodically updated. Database 105 may be updated using crawlers or updated manually.

Each Ranking Function 107 present in Server 101 performs a search over Database 105. Ranking Functions 107 may use crawlers or human-powered search engines for performing searches. Each Ranking Function 107 defines a set of rules based on which search is performed over Database 105. Each Ranking Function 107 then ranks the search results. The search results are ranked in the order they satisfy the rules set for the search. So, a searched document satisfying the guidelines set by a rule to a larger extent will be ranked higher than the document satisfying the guidelines less. For example, a Ranking Function may rank documents based on the number of times a keyword exists in the document. In another example, a Ranking Function may rank documents based on the prominence of the keyword in the page (e.g., if the keyword occurs in the title, a document is ranked higher than if a keyword occurs only in the main text). Each Ranking Function 107 returns an ordered set of search results. These results are encoded as a position vector that stores the identifiers to the search results in the set. Each position vector corresponds to a set of search results generated by Ranking Function 107. An example of a position vector for a set of search results is shown in FIG. 4. The position vector for set of search result 401 is a position vector 407 and the position vector for set of search result 403 is a position vector 409. Each Ranking Function 107 then sends this set of search results and position vector to Search Modulator 109.

Search Modulator 109 consolidates the search results across multiple sets of search results. Search Modulator 109 consolidates the multiple sets of search results to generate a comprehensive list of search results. Each search result that exists in more than one set of search results is consolidated to a single entry in the comprehensive list. The working of Search Modulator 109 has been illustrated in FIG. 4.

Referring to FIG. 4, an example of input and corresponding output is shown for Search Modulator 109. It has been assumed that there are only two sets of search results as input to Search Modulator 109 for the keyword "messenger". A set of search results 401 contains ranked sites 123—www.aol.com, 135—www.chat.yahoo.com, 149—www.msn.com/download/ and 161—www.indiatimes.com/1.jpg. Another set of search result 403 contains sites 122—www.aol.com/download, 135—www.chat.yahoo.com, 148—www.msn.com/download/messenger and 162—www.indiatimes.com/2.jpg. Along with set of search results 401, a corresponding position vector 407 is input to Search Modulator 109. Similarly, along with set of search results 403, a corresponding position vector 409 is input to Search Modulator 109. Search Modulator 109 identifies the sites being listed in more than one set of search results, in this case, www.chat.yahoo.com and www.msn.com/download. Search Modulator 109 finally prepares a comprehensive list of all search results 405. Comprehensive list of all search results 405 has a single entry for each search result. Comprehensive list of all search results 405 and the position vectors are then passed to Visualization Module 111. Data required to capture the consolidated search results is much less as compared to the amount of data required to capture each set of search results separately. Thus, Server 101 transfers entire search results to Client 103 using lesser information. Therefore, bandwidth consumption is optimized.

Visualization Module 111 at client 103 receives and stores the comprehensive list of search results. Visualization Module 111 may be implemented in any client-side programming language, such as JavaScript. Visualization Module 111 identifies the user-defined boundary and presents the desired sets of search results. For example, as presented in FIG. 4, in the consolidated result, there are two position vectors 411 and 413 corresponding to sets of search results 401 and 403. So, if the user defines the boundary as the search results of the Ranking Function corresponding to set of search results 401, then Visualization Module 111 will only pass position vector 411 with comprehensive list of search results 405 to GUI 113 for presentation.

Figure 5:
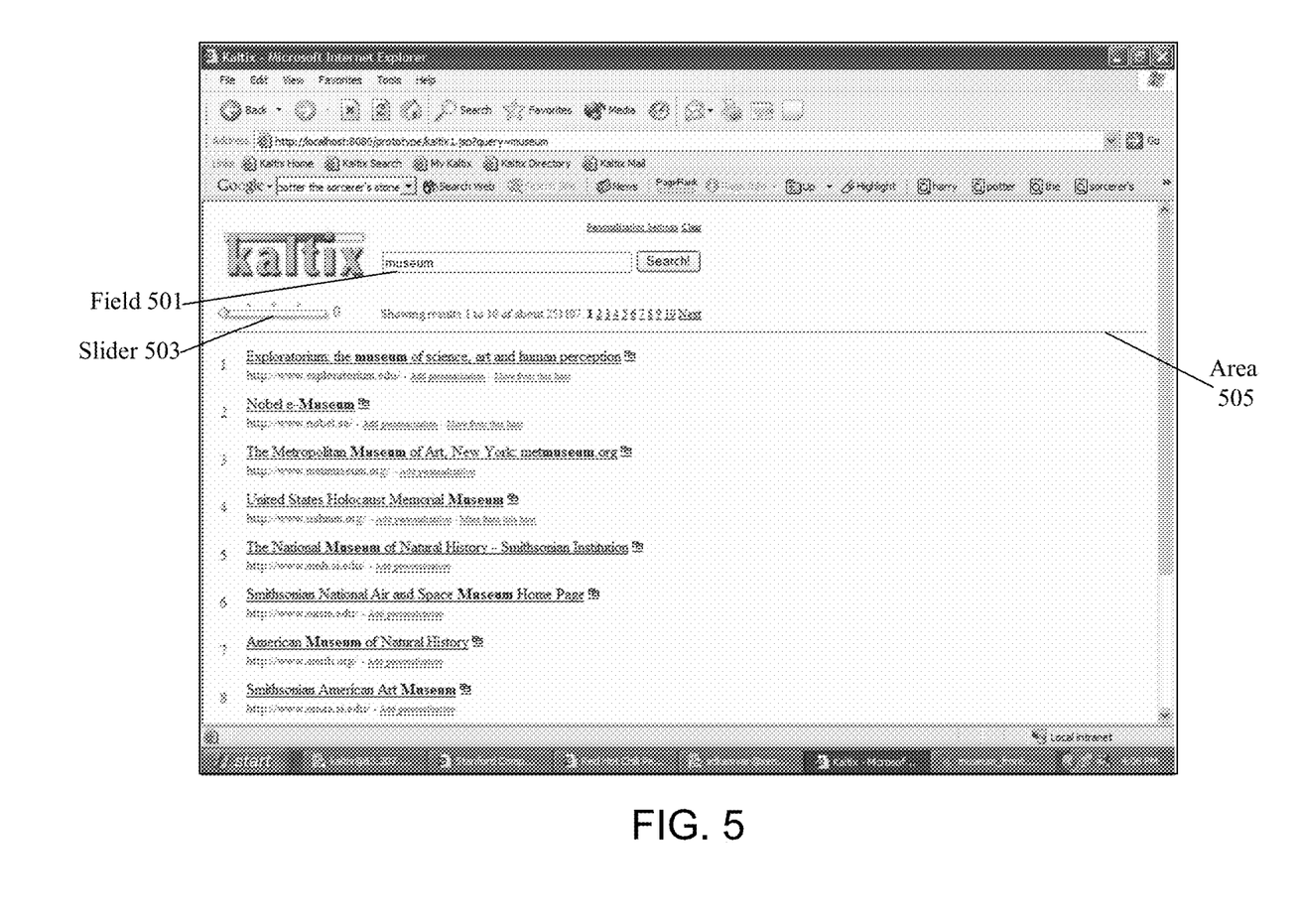
FIG. 5 is a snapshot of a Graphical User Interface that displays search results for a user query and a user defined boundary.
Figure 6:
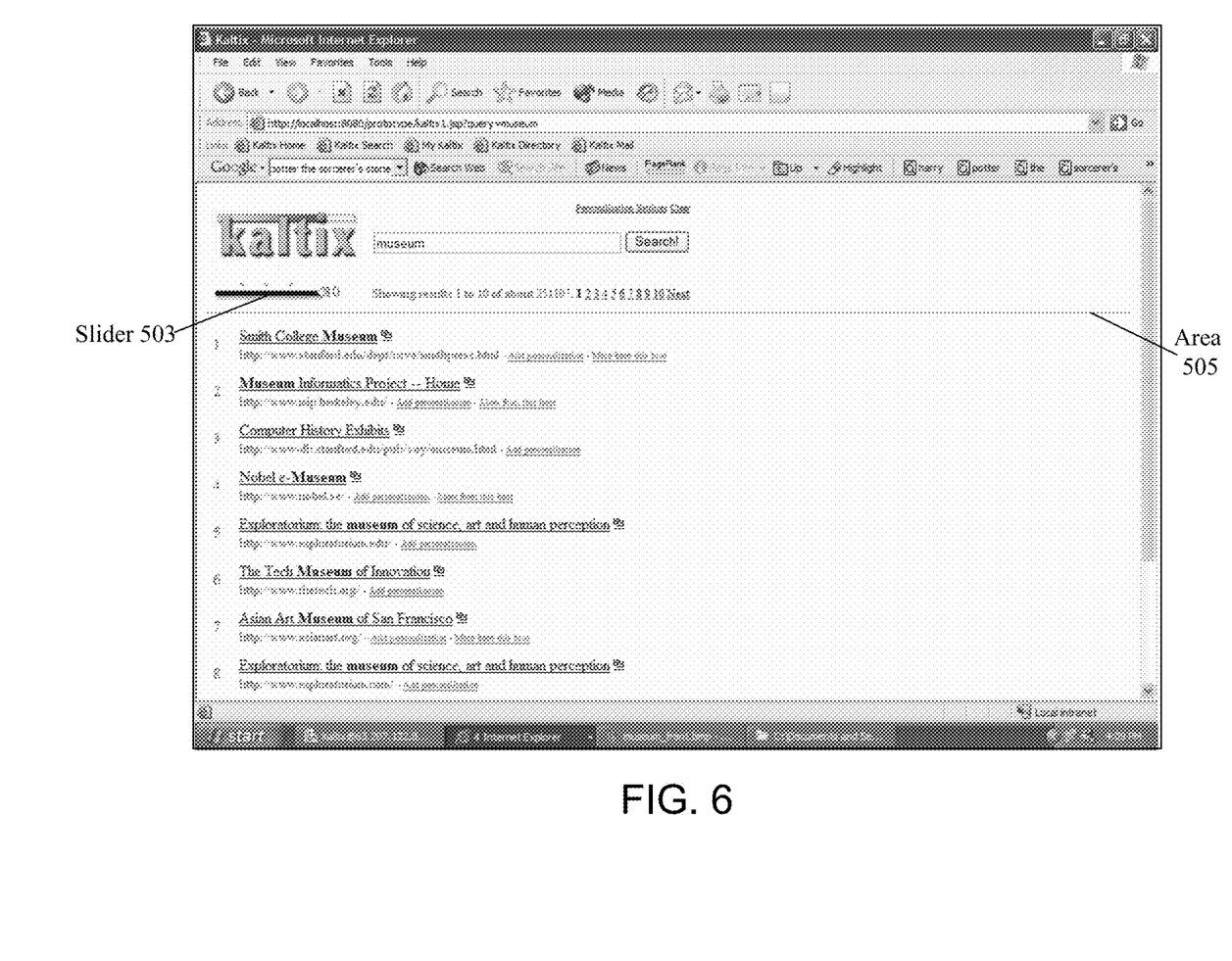
FIG. 6 is a snapshot of a Graphical User Interface that displays search results for the user query of FIG. 5 and a redefined boundary.

GUI 113 displays the search result provided by Visualization Module 111. FIG. 5 is a snapshot of GUI 113 that illustrates the search results according to a user-defined boundary. GUI 113 also takes input for a user-defined boundary. The input can be taken in two possible ways, as defined in FIG. 5 (and FIG. 6) and FIG. 7. FIG. 5 illustrates the presentation of the search results corresponding to Ranking Function at number 1. Here, the user inputs a query 'museum' in a field 501 and defines a boundary by selecting Ranking Function at number 1 using a slider 503. The search results for the user query 'museum' corresponding to the Ranking Function at number 1 are presented in an area 505. Similarly, FIG. 6 illustrates the presentation of the search results corresponding to Ranking Function at number 10. Here, the user redefines the boundary by selecting Ranking Function at number 10 using slider 503. The search results corresponding to Ranking Function at number 10 are presented in area 505.

Figure 7:
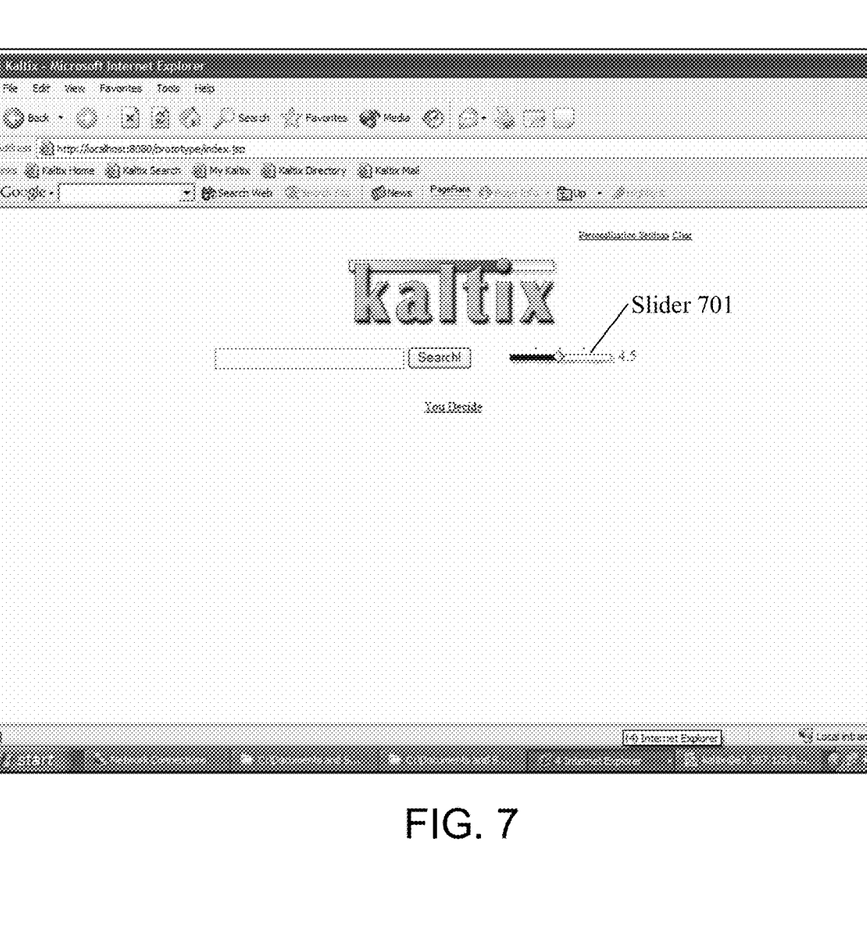
FIG. 7 is a snapshot of a Graphical User Interface that displays a combination of search results obtained by two Ranking Functions.

FIG. 7 illustrates a user preference for the display of results of a combination of Ranking Functions. The user defines the boundary for the display of the combination of Ranking Functions by using a slider 701. In case of such a boundary, Visualization Module 111 first normalizes the ranking of search results of different Ranking Functions to bring them to a common ranking platform. Visualization Module 113 may use any normalization tool known in the art to normalize rankings of search results of different ranking functions. As an example, a normalization tool may relate to assigning weights to different ranking functions. These weights are used to normalize the ranking lists across all ranking functions. A ranking list quantifies the ranks of search results for a set of search results. The normalized ranking lists are then used to rank individual search results across all sets of search results. These re-ranked results are then presented to the user requesting results of a combination of Ranking Functions.

An advantage of the disclosed invention is that only one interaction between the server and a client is required to display all search results for a query.

An advantage of the disclosed invention is that the amount of information that is communicated between the client and the server is consolidated. The comprehensive list that is generated prevents more that one copies of a document to be sent to the client. This reduces the usage of bandwidth.

Another advantage of the disclosed invention is that all ranking functions may reside on a single server. This reduces the bandwidth that is necessary to send queries and results back and forth between multiple third-party ranking functions.

Yet another advantage of the disclosed invention is that the use of an identifier (unique numerical ID) with every document makes the invention computationally less complex as compared to the prior art. A unique numerical ID for a document takes far less space than the actual document and than the URL of the document. Also, while consolidating the search results, comparing two numbers is far easier than comparing two documents. The comprehensive list of search results is a map from integers to URLs and/or titles of the documents. From server 101, the identifiers as well as the URLs (and/or titles) are passed to client 103. A key concept is that the URLs are only passed over once (in the comprehensive list), even if they occur in multiple sets of search results.

The system, as described in the disclosed method, or any of its components may be embodied in the form of a processing machine. Typical examples of a processing machine include a general-purpose computer, a programmed microprocessor, a micro-controller, a peripheral integrated circuit element, and other devices or arrangements of devices, which are capable of implementing the steps that constitute the disclosed method.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the disclosed method. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include connection of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method comprising:
    submitting, by a client device, a query to a first search engine of multiple different search engines;
    receiving information, by the client device and from the first search engine, in response to the query, the information comprising:
        a list of search results that are generated from multiple, discrete sets of search results that the first search engine identifies as responsive to the query, wherein the multiple, discrete sets of search results are obtained from the multiple different search engines, and
        multiple position vectors, each position vector specifying a ranking of search results of a respective discrete set of the multiple, discrete sets of search results;
    storing, by the client device, the information received from the first search engine in response to the query;
    receiving, by the client device, data indicating a selection identifying a particular discrete set of search results of the multiple discrete sets of search results, wherein the particular discrete set of search results corresponds to a set of search results obtained from one of the multiple different search engines; and
    in response to receiving, by the client device, the data indicating the selection of the particular discrete set of the multiple discrete sets of search results: (i) accessing the information received from the first search engine that is stored on the client device without communicating with the first search engine in order to reduce network bandwidth usage, and (ii) identifying, by the client device and using the accessed information, a particular position vector that corresponds to the particular discrete set of search results that is identified by the received data indicating the selection, and (ii) providing, for display by the client device, search results of the particular discrete set of search results, ordered according to the ranking specified by the identified particular position vector.

2. The method of claim 1, wherein each position vector of the multiple position vectors includes one or more identifiers, and wherein each identifier of the one or more identifiers corresponds to a search result of the respective set of search results.

3. The method of claim 2, wherein providing search results of the particular set comprises:
    identifying one or more identifiers in the particular position vector, wherein a quantity of the one or more identifiers corresponds to a quantity of search results to be provided for display; and
    identifying the one or more search results of the particular set corresponding to the one or more identifiers in the particular position vector.

4. The method of claim 1, the method further comprising:
    receiving boundary data specifying a quantity of search results to display; and in response to receiving the boundary data, providing, for display, the quantity of the one or more search results of the particular set.

5. The method of claim 1, wherein each particular discrete set of search results of the multiple discrete sets of search results is identified by a distinct ranking function of the first search engine.

6. The method of claim 1,
wherein receiving the data indicating the selection identifying the particular discrete set of search results of the multiple discrete sets of search results comprises receiving the data indicating the selection identifying (i) the particular discrete set of search results and (ii) a second set of search results, and
wherein providing, for display, one or more search results of the particular discrete set of search results comprises providing an updated list of search results that include one or more search results of each of the particular discrete set of search results and the second set of search results.

7. The method of claim 6, comprising:
obtaining a first normalized position vector using the position vector that corresponds to the particular set;
obtaining a second normalized position vector using the position vector that corresponds to the second set; and
obtaining the updated list of search results based on the first normalized position vector and the second normalized position vector.

8. The method of claim 1, comprising:
storing the list of search results and the multiple position vectors.

9. The method of claim 1, wherein receiving from the first search engine a list of search results and multiple position vectors comprises receiving from the first search engine in a single transaction, the list of search results and the multiple position vectors.

10. A non-transitory computer-readable medium having stored thereon instructions, which, when executed by one or more computers, cause the one or more computers to perform operations of:
submitting, by a client device, a query to a first search engine of multiple different search engines;
receiving information, by the client device and from the first search engine, in response to the query, the information comprising:
a list of search results that are generated from multiple, discrete sets of search results that the first search engine identifies as responsive to the query, wherein the multiple, discrete sets of search results are obtained from the multiple different search engines, and
multiple position vectors, each position vector specifying a ranking of search results of a respective discrete set of the multiple, discrete sets of search results;
storing, by the client device, the information received from the first search engine in response to the query;
receiving, by the client device, data indicating a selection identifying a particular discrete set of search results of the multiple discrete sets of search results, wherein the particular discrete set of search results corresponds to a set of search results obtained from one of the multiple different search engines; and
in response to receiving, by the client device, the data indicating the selection of the particular discrete set of the multiple discrete sets of search results: (i) accessing the information received from the first search engine that is stored on the client device without communicating with the first search engine in order to reduce network bandwidth usage, and (ii) identifying, by the client device and using the accessed information, a particular position vector that corresponds to the particular discrete set of search results that is identified by the received data indicating the selection, and (ii) providing, for display by the client device, search results of the particular discrete set of search results, ordered according to the ranking specified by the identified particular position vector.

11. The computer-readable medium of claim 10, wherein each position vector of the multiple position vectors includes one or more identifiers, and wherein each identifier of the one or more identifiers corresponds to a search result of the respective set of search results.

12. The computer-readable medium of claim 10, the operations further comprising:
receiving boundary data specifying a quantity of search results to display; and
in response to receiving the boundary data, providing, for display, the quantity of the one or more search results of the particular set.

13. The computer-readable medium of claim 10, wherein each particular discrete set of search results of the multiple discrete sets of search results is identified by a distinct ranking function of the first search engine.

14. The computer-readable medium of claim 10,
wherein receiving the data indicating the selection identifying the particular discrete set of search results of the multiple discrete sets of search results comprises receiving the data indicating the selection identifying (i) the particular discrete set of search results and (ii) a second set of search results, and
wherein providing, for display, one or more search results of the particular discrete set of search results comprises providing an updated list of search results that include one or more search results of each of the particular discrete set of search results and the second set of search results.

15. A system comprising:
one or more processors and one or more computer storage media storing instructions that are operable, when executed by the one or more processors, to cause the one or more processors to perform operations comprising:
submitting, by a client device, a query to a first search engine of multiple different search engines;
receiving information, by the client device and from the first search engine, in response to the query, the information comprising:
a list of search results that are generated from multiple, discrete sets of search results that the first search engine identifies as responsive to the query, wherein the multiple, discrete sets of search results are obtained from the multiple different search engines, and
multiple position vectors, each position vector specifying a ranking of search results of a respective discrete set of the multiple, discrete sets of search results;
storing, by the client device, the information received from the first search engine in response to the query;
receiving, by the client device, data indicating a selection identifying a particular discrete set of search results of the multiple discrete sets of search results, wherein the particular discrete set of search results corresponds to a set of search results obtained from one of the multiple different search engines; and in response to receiving, by the client device, the data indicating the selection of the particular discrete set of the multiple discrete sets of search results: (i) accessing the information received from the first search engine that is stored on the client device without communicating with the first search engine in order to reduce network bandwidth usage, and (ii) identifying, by the client device and using the accessed information, a particular position vector that corresponds to the particular discrete set of search results that is identified by the received data indicating the selection, and (ii) providing, for display by the client device, search results of the particular discrete set of search results, ordered according to the ranking specified by the identified particular position vector.

16. The system of claim 15, wherein each position vector of the multiple position vectors includes one or more identifiers, and wherein each identifier of the one or more identifiers corresponds to a search result of the respective set of search results.

17. The system of claim 15, the operations further comprising:

receiving boundary data specifying a quantity of search results to display; and in response to receiving the boundary data, providing, for display, the quantity of the one or more search results of the particular set.

18. The system of claim 15, wherein each particular discrete set of search results of the multiple discrete sets of search results is identified by a distinct ranking function of the first search engine.

19. The system of claim 15, wherein receiving the data indicating the selection identifying the particular discrete set of search results of the multiple discrete sets of search results comprises receiving the data indicating the selection identifying (i) the particular discrete set of search results and (ii) a second set of search results, and wherein providing, for display, one or more search results of the particular discrete set of search results comprises providing an updated list of search results that include one or more search results of each of the particular discrete set of search results and the second set of search results.

* * * * *

UNITED STATES PATENT AND TRADEMARK OFFICE
CERTIFICATE OF CORRECTION

PATENT NO. : 10,185,770 B2
APPLICATION NO. : 14/078464
DATED : January 22, 2019
INVENTOR(S) : Haveliwala et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Twenty-seventh Day of August, 2019

Andrei Iancu
*Director of the United States Patent and Trademark Office*